(12) United States Patent
Teyssandier et al.

(10) Patent No.: US 9,921,328 B2
(45) Date of Patent: Mar. 20, 2018

(54) ADAPTABLE SEISMIC SOURCE FOR SEISMIC SURVEYS AND METHOD

(71) Applicant: CGG SERVICES SA, Massy (FR)

(72) Inventors: Benoit Teyssandier, Massy (FR); Dominique Thomas, Gif-sur-Yvette (FR); Robert Dowle, Massy (FR); John Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 15 days.

(21) Appl. No.: 14/889,194

(22) PCT Filed: Jun. 13, 2014

(86) PCT No.: PCT/EP2014/062317
§ 371 (c)(1),
(2) Date: Nov. 5, 2015

(87) PCT Pub. No.: WO2014/198865
PCT Pub. Date: Dec. 18, 2014

(65) Prior Publication Data
US 2016/0084978 A1  Mar. 24, 2016

Related U.S. Application Data

(60) Provisional application No. 61/844,569, filed on Jul. 10, 2013, provisional application No. 61/834,580, filed on Jun. 13, 2013.

(51) Int. Cl.
*G01V 1/38* (2006.01)
*G01V 1/00* (2006.01)

(52) U.S. Cl.
CPC ............ *G01V 1/3861* (2013.01); *G01V 1/006* (2013.01); *G01V 1/3808* (2013.01)

(58) Field of Classification Search
CPC ..... G01V 1/006; G01V 1/3861; G01V 1/3808
(Continued)

(56) References Cited

U.S. PATENT DOCUMENTS 3,690,405 A * 9/1972 Hance .................. H04R 1/2819
181/155
4,346,462 A   8/1982 du Boullay
(Continued)

FOREIGN PATENT DOCUMENTS

GB   1583042 A   1/1981

OTHER PUBLICATIONS

International Search Report in related International Application No. PCT/EP2014/062317, dated Jan. 12, 2015.
(Continued)

*Primary Examiner* — Daniel L Murphy
(74) *Attorney, Agent, or Firm* — Patent Portfolio Builders PLLC

(57) ABSTRACT

Method, source array and seismic vibro-acoustic source element for seismic data acquisition. The method includes storing in a controller a library of beam form factor sets associated with a source array and corresponding regions to be surveyed; towing the source array along survey lines over the regions to be surveyed; selecting a beam form factor set from the library to be applied to the source array for each region; and actuating the source array based on the selected set of beam form factors and a position of the source array relative to the regions. Each set of beam form factors maps to a corresponding region of an area to be surveyed.

19 Claims, 14 Drawing Sheets

(58) Field of Classification Search
USPC .......................................................... 367/23
See application file for complete search history.

(56) References Cited

U.S. PATENT DOCUMENTS

| | | |
|---|---|---|
| 4,918,668 A | 4/1990 | Sallas |
| 6,366,895 B1* | 4/2002 | Woodsum ................ H01Q 3/26 342/373 |
| 2005/0128874 A1 | 6/2005 | Herkenhoff et al. |
| 2009/0219783 A1 | 9/2009 | Hogstad et al. |
| 2013/0100778 A1 | 4/2013 | Ruet et al. |

OTHER PUBLICATIONS

Written Opinion of the International Searching Authority in related International Application No. PCT/EP2014/062317, dated Jan. 12, 2015.

* cited by examiner

ADAPTABLE SEISMIC SOURCE FOR SEISMIC SURVEYS AND METHOD

CROSS REFERENCE TO RELATED APPLICATIONS

The present application claims the benefit of priority under 35 U.S.C. § 119(e) to U.S. Provisional Application No. 61/834,580 filed on Jun. 13, 2013, and U.S. Provisional Application No. 61/844,569 filed on Jul. 10, 2013. The entire contents of each of the above documents is hereby incorporated by reference into the present application.

BACKGROUND

Technical Field

Embodiments of the subject matter disclosed herein generally relate to methods and systems and, more particularly, to mechanisms and techniques for dynamically adjusting an illumination of the subsurface during a seismic survey.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends energy waves into the earth. By measuring the time it takes for the reflections to come back to plural sensors, it is possible to estimate the depth and/or composition of the features causing such reflections. These features may be associated with subterranean hydrocarbon deposits.

For marine applications, sources are mainly impulsive (e.g., compressed air is suddenly allowed to expand). One of the most used sources is air guns which produce a high amount of acoustic energy over a short time. Such a source is towed either at the water surface or at a certain depth by a vessel. Acoustic waves from the air gun propagate in all directions. The emitted acoustic waves' typical frequency range is between 6 and 300 Hz. However, the frequency content of the impulsive sources is not fully controllable, and different sources are selected depending on a particular survey's needs. In addition, use of impulsive sources can pose certain safety and environmental concerns.

Thus, another class of sources that may be used is vibratory. Vibratory sources, including hydraulically-powered, electrically-powered or pneumatically-powered sources and those employing piezoelectric or magnetostrictive material, have been used in marine operations. A positive aspect of vibratory sources is that they can generate signals that include various frequency bands, commonly referred to as "frequency sweeps." In other words, the frequency band of such sources may be better controlled, as compared to impulsive sources.

One example of such a vibratory source element is described in U.S. patent application Ser. No. 13/415,216 (herein the '216 application), filed on Mar. 8, 2012, and entitled, "Source for Marine Seismic Acquisition and Method," assigned to the same assignee as the present application, the entire content of which is incorporated herein by reference.

Source arrays (i.e., a plurality of vibratory source elements) are now used in marine seismic acquisition because they more efficiently generate acoustic energy. The source array can be towed at a single depth or at variable depths, as would be the case for a curved source array. Dual or multi-level arrays are also sometimes used to reduce the effect of spectral notches due to destructive interference with surface reflections. A source array including source elements that are uniformly distributed at a single depth and operate synchronously with identical output spectra tends to create a symmetrical directivity radiation pattern.

With regard to FIG. 1, if a single-depth source array 110 including identical source elements 108 is towed behind a vessel 101, the energy emitted by the source array tends to be symmetrical, with equal amounts of energy radiated toward vessel 101 and toward the rear of this arrangement. Because the receiver array or streamer 105, which typically includes hydrophones 106 (it can also include particle motion sensors or any sensor configured to detect seismic signals), is also towed behind vessel 101, much of the acoustic energy source array 110 radiates is not helpful for illuminating a subterranean target that might be a hydrocarbon reservoir.

This may become more problematic when trying to image a dipping reflection event 118, for example, the flank of a salt dome below the ocean bottom 116. As can be seen in FIG. 1, the energy emitted that follows ray path 112 does strike the target, i.e., the dipping reflection event 118. Its reflection path reenters the water at an unfavorable angle so streamer 105 does not receive the acoustic energy. Thus, this energy is wasted. Note that only energy following ray path 114 arrives at streamer 105.

Thus, there is a need to provide a method that directs and maximizes acoustic energy in a preferred direction (beam steering) to better illuminate a target of interest so that most of the reflected energy is directed toward the streamer spread.

SUMMARY

According to an embodiment, there is a method for seismic data acquisition. The method includes storing in a controller a library of beam form factor sets associated with a source array and corresponding regions to be surveyed; towing the source array along survey lines over the regions to be surveyed; selecting a beam form factor set from the library to be applied to the source array for each region; and actuating the source array based on the selected set of beam form factors and a position of the source array relative to the regions. Each set of beam form factors maps to a corresponding region of an area to be surveyed.

According to another embodiment, there is a method for generating sets of beam form factors associated with a source array. The method includes receiving prior seismic data related to an area to be surveyed, wherein the area to be surveyed includes plural regions having different geological characteristics; calculating beam form factor sets for the source array for each region based on the prior seismic data and the geological characteristics of the region; and storing in a library the beam form factors sets.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
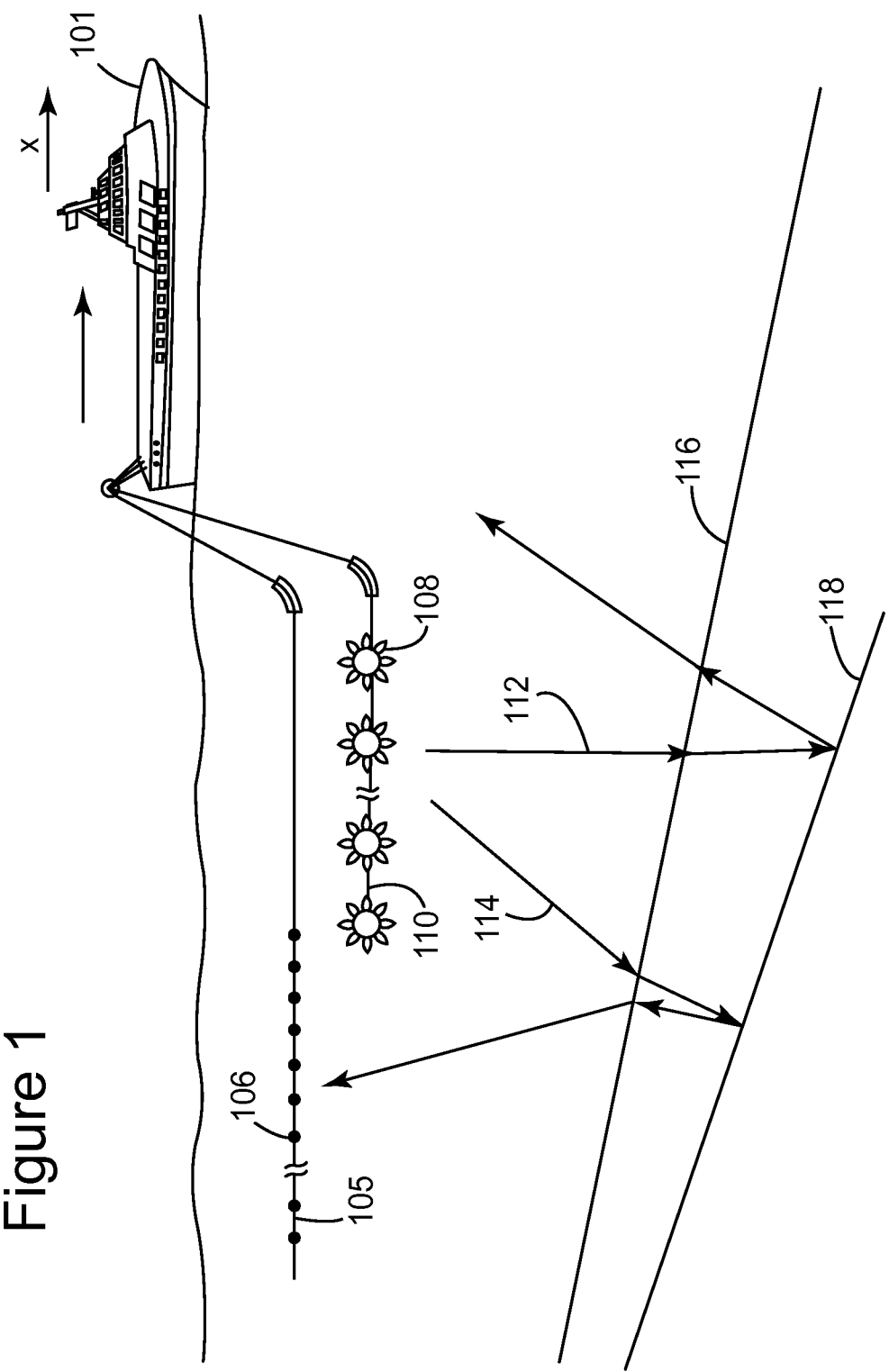
FIG. 1 is schematic diagram of a traditional marine seismic survey system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source array that includes plural individual vibratory source elements configured to generate acoustic energy in a marine environment. However, the embodiments to be discussed next are not limited to a marine environment; they may be applied to any type of source array in which its individual elements can be independently controlled so that beam steering can be achieved or in which control of a shape of the source array's output beam is desired.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a seismic acquisition system that includes one or more vibratory source arrays. A library of beam form factors for each source element may be calculated prior to the seismic survey. A beam form factor takes into account at least two features, the geometry of the source array (e.g., the position of the source element in the source array) and a beam form filter of the source array. The beam form filter characterizes a source array's capability to direct a beam in a certain direction. Thus, if the geometry of the source array is fixed in place, the beam form factors become the same with the beam form filters. During a specific seismic survey, depending on the a priori information about the subsurface, the size and position of the streamer spread and the types and composition of the seismic source array, an appropriate beam form factor may be selected (dynamically or not) for each source element to control the illumination of a desired subsurface feature.

Typically, for a given area 202 to be surveyed (see FIG. 2), prior seismic surveys have been conducted and a new survey is performed to re-collect data in the same area with new techniques in the hope of improving resolution and image quality. Thus, in general, there is some prior knowledge of subterranean features in area 202 that is to be surveyed. Also, because the processing power onboard the seismic vessel has grown significantly, it is possible to produce brute stacks or other intermediate displays that can be used to obtain a "first look" at the data quality and subterranean features.

If prior knowledge for surveyed area 202 is unavailable, then it is possible to run a preliminary survey test 200, e.g., run only a couple of lines (e.g., lines 204-1, 204-6, 204-11, 204-17 and 204-N, where N can take various values depending on the size of the full survey) of the full survey (204-1 to 204-N). The number of lines of the preliminary survey test is illustrative only. Those skilled in the art would recognize that this number depends on the specific features of the subsurface. For example, if, during the preliminary survey, data acquisition along line 204-11 indicates a likelihood of encountering an area 220 having different characteristics than area 202, the next survey lines may be denser so that the approximate shape of area 220 is identified. The same may happen for other areas detected to be different from area 202. The preliminary survey uses a "scanning source" to help determine favorable angles for target illumination. For the preliminary survey test, the source array may be activated using any beam form forms, and seismic data is recorded with the streamer spread. Then, the recorded seismic data may be processed onboard the vessel, or it may be sent to a land processing center for quick processing. Applying known processing algorithms, e.g., migration, mirror migration, full waveform inversion, etc., a basic final image of the area of interest may be determined. Based on this image or other parameters, it may be determined that there are one or more areas (210, 220, or 230) needing special attention during the full survey. As discussed above, these areas may include chalk, salt dome, dipping regions, faults, canyons, methane clathrates, gas zones, etc. that necessitates special attention.

Figure 2:
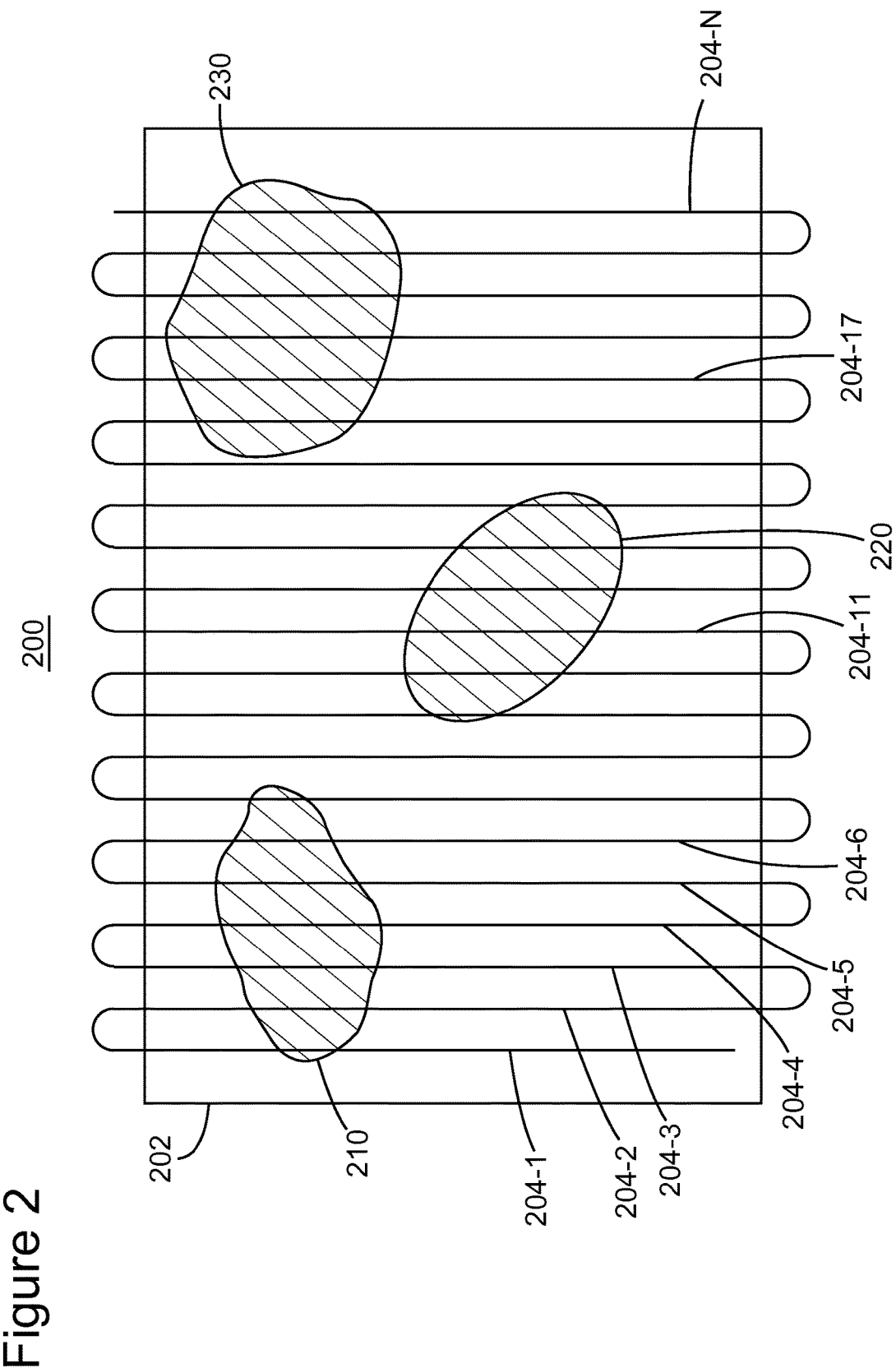
FIG. 2 is a schematic diagram of a marine seismic survey system having regions with different characteristics.

For exemplary purposes, assume that area 210 is identified to be a chalk region, area 220 is identified to be a salt dome and area 230 is identified to include severe dipping regions. Those skilled in the field would understand that these areas' contours are not well defined until a full-scale survey is performed. The contours shown in FIG. 2 are approximate and based on preliminary survey test 200. However, these approximate areas are helpful in fine-tuning acquisition of the full survey. For this particular example, considering that the library of beam form factors $G_i$ already includes elements for the chalk area $G_i^c$, for the dome region $G_i^d$, and for the severe dipping region $G_i^{dr}$, and also considering that the "map" illustrated in FIG. 2 is stored in a controller (not shown) on the vessel, the controller may dynamically select the beam form factors for each source element of the source array during the seismic survey to optimally illuminate each area. In other words, after the various areas' correct form factors are identified, the adaptable source array is adjusted during the full survey so that its beam is directed to illuminate the target zone at a favorable angle for that particular source point based upon the prior scanning source survey result. The favorable angle is likely to change with each source point. Thus, in one application, new form factors are applied only after a preset number of source points have been shot.

Beam steering may be achieved in various ways. For example, because each source array source element may be individually controlled, the entire source array may be controlled in a way that produces a "phased" or "beam steered" array. Ordinarily, source elements are all operated synchronously (in phase with one another), and the source array's dimension is small to avoid directivity notches in particular directions for frequencies of interest, with the objective of the source array uniformly illuminating the target area. However, when trying to image weak targets, it is advantageous to steer source array emissions. One way to change the source array's directivity pattern is to operate multiple source elements at the same phase, but have them operate at different depths. This creates a tilted acoustic wave front; its main lobe attains a maximum at an angle away from vertical. However, in most cases, the source array has a fixed geometry and it can be difficult to modify the source elements' positions in a short time. Also, the vessel is constantly moving, typically traveling in a straight line for a few miles, and then turning around to collect data along a path parallel to the previous pass, but in the opposite direction. Thus, means to change the source acoustic energy directivity pattern that takes into account subterranean geometry, vessel location, and streamer spread location so as to maintain favorable target illumination are valuable.

As an alternative, source elements operating at approximately the same depth can be phased differently. The result is that the source array's directivity pattern can be tilted to approximate the same pattern as source elements operating synchronously at different depths. Phasing can be just a time delay, but because of the surface ghost contribution, in practice, the phasing scheme may be more complicated.

Another factor that can change source array directivity patterns is source element amplitude. While it is ordinarily desirable to operate all source elements at their maximum output, it is anticipated that in some situations it might be desirable to have the output of at least one source element different from the others. The difference in amplitude could be invariant with frequency or change with frequency. For example, a special case might be to use variable amplitudes to tune out the direct arrival (horizontally propagating) energy from the source array that impinges on the near offset hydrophones (see, for example, Sallas, U.S. Pat. No. 4,918, 668, the entire content of which is incorporated herein by reference). Thus, this constraint could be incorporated into a cost function as part of the target directivity pattern.

Because changing the source array's geometry or changing the vessel's path frequently is impractical, electronic beam steering can provide a more practical option to keep the radiated energy directed toward the target in such a fashion that reflected energy useful for imaging could be received and recorded by the streamer spread receivers.

One example of how to steer a source array's beam for achieving desired directivity is now discussed. The beam-steering process can also be used to create ghost notch diversity when the source elements are disposed at different depths. If the source elements are disposed at the same depth, the ghost notch diversity may be achieved for energy propagating away from the vertical angle. For example, in marine acquisition, spectral notches in down-going acoustic energy can occur in the amplitude spectrum of conventional constant depth source arrays due to the effect of destructive interference with the surface reflection. Dual-depth or variable-depth source elements provide means to counter this effect. One option is a curved source array. Because the source elements are located at different depths, reflections will constructively and destructively interfere, causing spectral notches to be filled in when compared to constant depth arrays. Another option might be to use one or more of the source elements at different depths. In other words, it is possible to operate, for a low-frequency sweep (e.g., 5-25 Hz) some source elements at a 25 m depth, and for a high-frequency sweep (e.g., 25-125 Hz), to operate some of the source elements at a 5 m depth.

Thus, an algorithm discussed next can be applied not only for beam-steering purposes, but also for filling spectral notches in the source array output. For simplicity, the beam-steering process discussed now is implemented using a curved source array with beam form factors. The process may be adapted to use phase steering, amplitude steering, or both. The process may also be adapted to vertically distributed source elements.

Figure 3:
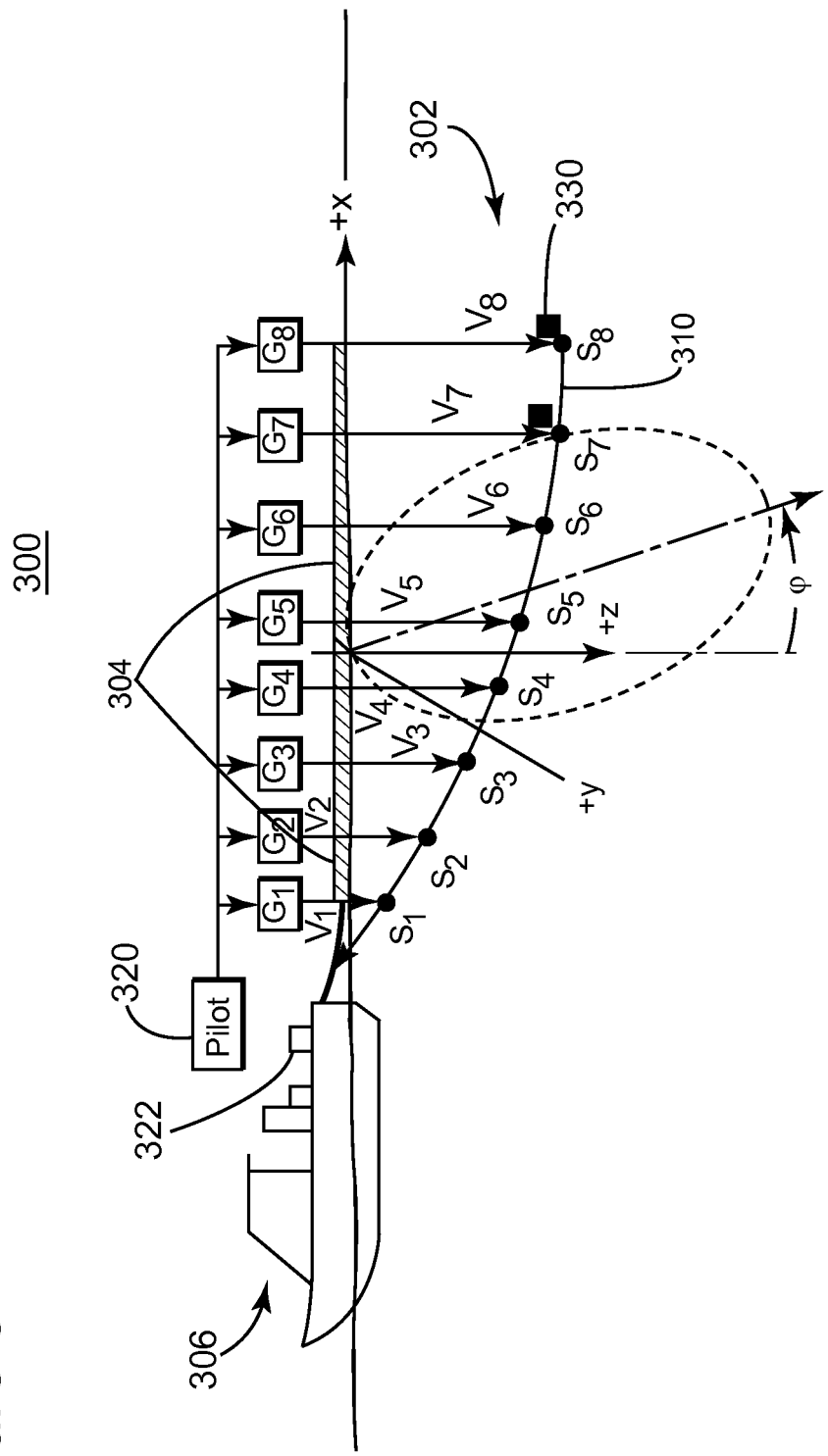
FIG. 3 is a schematic diagram of beam form factors to be applied to individual source elements to steer a beam.

With regard to FIG. 3, a source array 300 includes at least one source sub-array 302 having plural source elements $S_1$ to $S_8$ suspended from a support device 304 (e.g., a float) attached to a vessel 306. Source elements $S_1$ to $S_8$ are distributed along a curved line 310, which may be a parameterized curve. A pilot signal 320 that can be a conventional swept sine over a predetermined frequency range or some other excitation signal, for example, a band-limited pseudorandom signal, can be convolved with beam form filters $G_1$ to $G_8$ (to be calculated by a process disclosed next) to form drive signals $V_1$ to $V_8$. The pilot signal and the beam form factors may be processed in a controller 322 on vessel 306 or in a distributed controller that has some parts on the actual source elements. These signals may be stored in the memory of the source controllers 330, which are located at the source elements, on controller 322, or distributed between the source elements and the vessel's controller. Upon receiving a command from the controller 322, sources $S_1$ to $S_8$ emit an acoustic signal using a feedback control system to emit acoustic energy that tracks drive signals $V_1$ to $V_8$. In other words, acoustic emissions of source elements $S_1$ to $S_8$ have the same amplitude and phase spectra as drive signals $V_1$ to $V_8$ that are used as reference signals by the respective source elements $S_1$ to $S_8$ source controllers.

Beam form filters $G_1$ to $G_8$ are designed to adjust the pilot signal phase and/or amplitude to ensure that acoustic energy radiated by the source array is maximized in a preferred direction over a frequency band of interest. In FIG. 3, this preferential angle is the vertical angle $\varphi$ over a range of azimuths. Not shown is the azimuth angle $\theta$, which is useful for describing the beam width. Beam form filters $G_1$ to $G_8$ may be designed, as a function of the source array's geometry, to direct the radiated acoustic energy with a desired vertical angle and/or azimuth angle for illuminating selected features of the subsurface of interest.

Source array performance can be optimized, subject to given constraints. In other words, an iterative search procedure can be implemented that finds filters $G_1$ to $G_8$ to form the beam over a range of frequencies given a certain source geometry, and calculates a performance index for that geometry. Then, the source elements' phases and/or amplitudes are changed and a new set of filters is found. The procedure may be repeated for different geometries to determine a set of beam form factors. The performance index for those phases and/or amplitudes and/or geometries is calculated and compared to previous candidate performance. After either the desired target performance index is achieved or a best choice for a predetermined number of loop iterations is found, the filters $G_1$ to $G_8$ and the beam form factors are made available for download into the seismic survey system. A library of beam form filters $G_i$ may include elements calculated for each type of subsurface to be surveyed for a given source array geometry and the beam form factors also take into account the various possible source array geometries.

Figure 4:
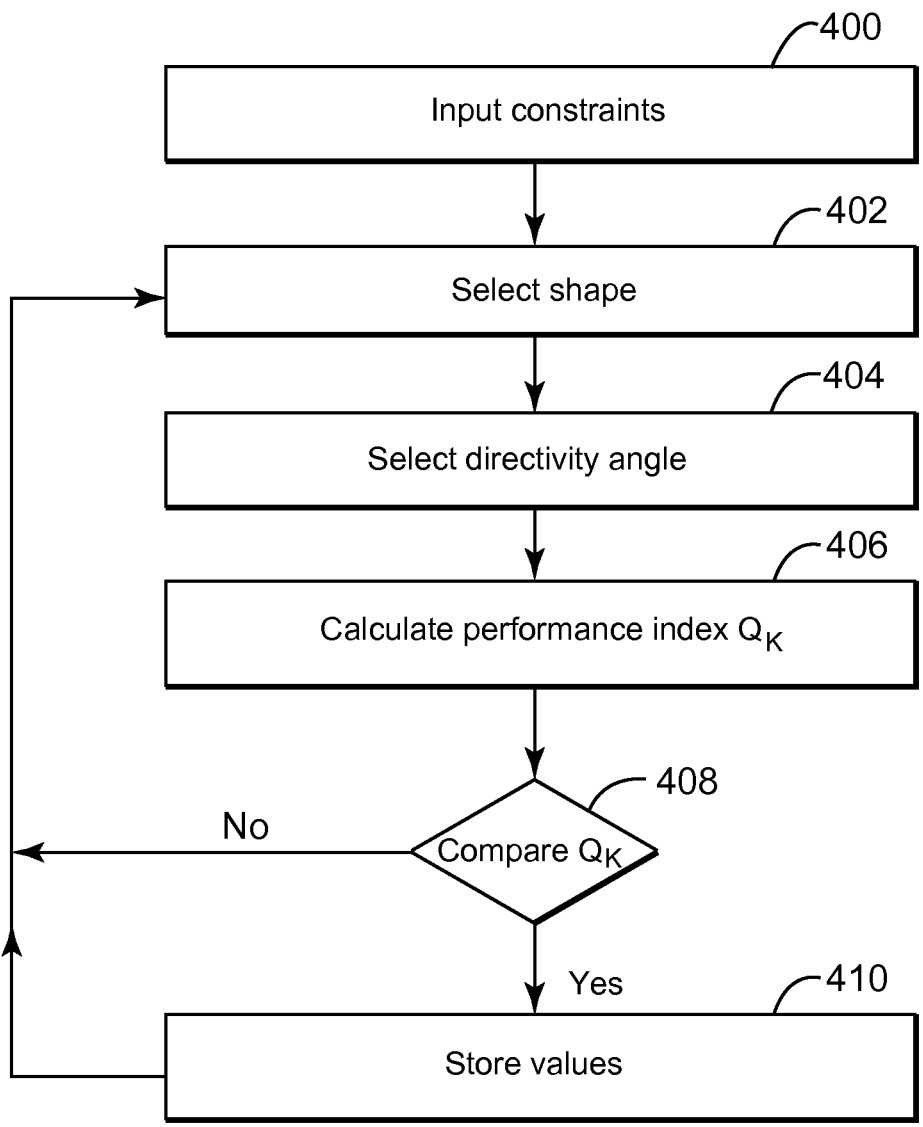
FIG. 4 is a flowchart of a method for calculating beam form factors for a source array.

This process is now discussed in more detail with regard to FIG. 4. In step 400, various constraints related to the geometry and size of the source array are entered. For example, these constraints may include a number Ns of the real source (actual) elements, Fmin, which is a minimum frequency of interest, Fmax, which is a maximum frequency of interest, Zmin, which is a minimum source element depth, Zmax, which is a maximum source element depth, Lmin, which is a minimum source array length, Lmax, which is a maximum source array length, and $\alpha_1$ and $\alpha_2$, which define the beam azimuth angle range. Other constraints may be considered.

In step 402, a shape of line 310 may be chosen. For example, for simplicity, a sinusoid shape (a portion of a sine wave) is chosen for line 310. Other parameterized curves may be selected. Alternatively, no shape may be selected and, thus, the process itself will determine the phases and/or amplitudes of the source elements. Then, in step 404, a directivity angle $\varphi$ is selected so that the algorithm maximizes the source array output for the selected directivity angle $\varphi$ over the frequency range of interest and over a range of azimuth angles as noted in step 400.

If the source elements are spaced uniformly along the X direction (inline direction), and the last element in the source array (or sub-array) is farthest from the vessel and the deepest, then the X and Z positions of the nth source element, where index n=1, 2 . . . Ns, are given by:

$$X_n = -\frac{L}{2} + \frac{nL}{N_s},$$

Y=0, and $Z_n = Z_{N_s} \sin\{(\pi/2)(n+\alpha-1)/(N_s+\alpha-1)\}$, where "L" is a horizontal distance between first and last source elements in the source array, "n" is the index of a source element, and "a" is a coefficient determined by the number of sources and the minimum and maximum candidate distribution source depths. The calculation of "a" is described below with reference to equation (1).

Only four parameters are necessary to determine the position of all source elements. These parameters are $N_s$, L, $Z_1$ and $Z_{Ns}$, with source element $S_1$ at position $(-L/2, 0, Z_1)$, where in this example $Z_1$ is the shallowest, and source element $S_{Ns}$ at position $(+L/2, 0, Z_{NS})$ is the deepest at depth $Z_{Ns}$. If $Z_1$ is chosen to have a given value, then parameter "a" may be calculated as follows, where function asin( ) is the arcsin function:

$$a = \frac{2(N_s - 1) \cdot \operatorname{asin}\left(\frac{Z_1}{Z_{N_s}}\right)}{\pi - 2 \cdot \operatorname{asin}\left(\frac{Z_1}{Z_{N_s}}\right)}. \quad (1)$$

Figure 5:
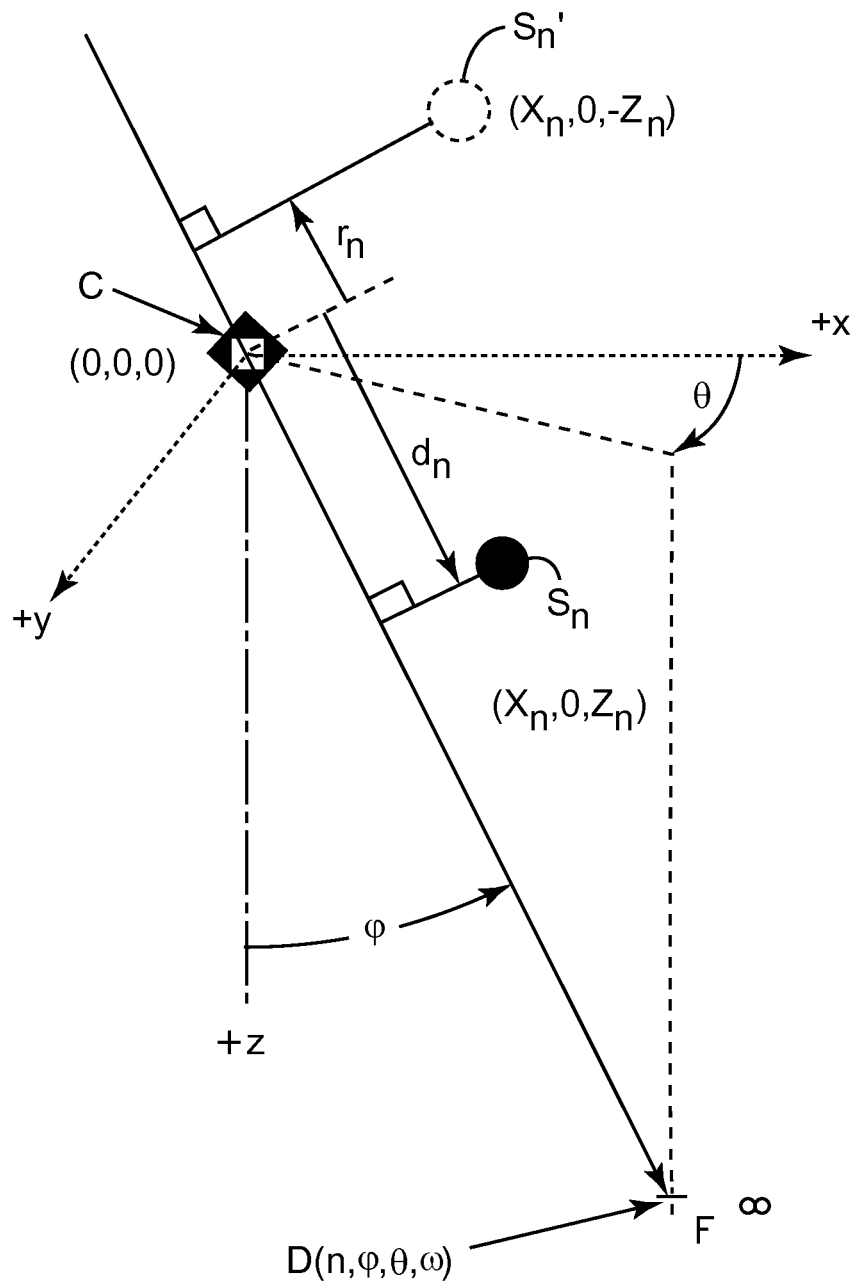
FIG. 5 is a schematic diagram of a source element and its virtual corresponding source used for calculating a far-field signature.

An overall performance index $Q_k$ is calculated in step 406 as follows. An effective center C of the source array (or sub-array) of real and virtual sources is assumed to be at the waterline as illustrated in FIG. 5. FIG. 5 shows a single source element $S_n$ and its corresponding virtual source (or notional source) $S_n'$. A virtual source is considered to be the mirror image of the real source when the mirror surface is considered to be the water surface. The virtual source is introduced to account for the ghost introduced by the reflective property of the air-water interface, which is known to reflect seismic waves trying to escape the water. Center C of the array may be the geometrical center of the source elements if the source elements are identical. Other measures may be used for defining the array's center. In this embodiment, center C is considered to be located at the origin of the XYZ system of reference. Consider D (n, $\varphi$, $\theta$, $\omega$) to be the far-field contribution of source element $S_n$ and its ghost $S_n'$ at vertical angle $\varphi$, azimuth $\theta$, for a natural frequency $\omega$. Note that azimuth angle defines the position of the beam in the plane defined by X and Y axes. Then, in the frequency domain assuming a surface reflection coefficient of −1, the far-field contribution can be expressed as:

$$D(n,\varphi,\theta,\omega) = G(n,\omega) \cdot \{e^{j\omega d_n/c} - e^{-j\omega r_n/c}\}, \quad (2)$$

where G is the beam form filter, $d_n$ is the orthogonal projected distance of $S_n$ along the ray path from C to an imaginary point F at infinity, where the far-field signature is calculated, and $r_n$ is the orthogonal projected distance of the notional source $S_n'$ along the ray path from C to the imaginary point F. Thus, $d_n$ is given by:

$$d_n = X_n \sin(\varphi)\cos(\theta) + Z_n \cos(\varphi) \quad (3)$$

and $r_n$ is given by:

$$r_n = X_n \sin(\varphi)\cos(\theta) - Z_n \cos(\varphi). \quad (4)$$

If $A(\varphi, \theta, \omega)$ is the total far-field combined output of the source array at vertical angle $\varphi$, azimuth angle $\theta$ and natural frequency $\omega$, i.e., the sum of the contributions from $S_1$ to $S_{Ns}$ and their surface reflections, then $A(\varphi, \theta, \omega)$ is given by:

$$A(\varphi,\theta,\omega) = \sum_{n=1}^{N_s} D(n,\varphi,\theta,\omega). \quad (5)$$

Next, the values for the filters $G_1$ to $G_{Ns}$ are computed based on equation (5) for each frequency. In practice, a set of discrete frequencies are selected and the filters for this frequency set are calculated, and then the values for the filters for other frequencies are interpolated from the calculated filter values. In other words, suppose that the frequency band of interest is 10 to 30 Hz and the frequency subset includes discrete frequencies 10, 16, 20, 25 and 30 Hz. Then, the performance index is calculated only for these discrete frequencies to provide a solution for filters $G_1$ to $G_{Ns}$. For all other frequencies emitted by the source array in the band of 10 to 30 Hz, the values for filters $G_1$ to $G_{Ns}$ are calculated by interpolation or other equivalent mathematical process. The frequency band and discrete frequencies noted above are only exemplary and are not intended to limit the invention. The interpolation operation assumes that the G functions have smooth transitions. Thus, the G function for a given frequency $\omega$ and a given source element n is given by:

$$G(n,\omega) = B(\omega)e^{+j[\omega(\tau_n) + \Theta(n,\omega)]} \quad (6)$$

where $B(\omega)$ is an amplitude level which is non-zero and real, $\tau_n$ is a time advance, and $\Theta(n,\omega)$ is an added phase perturbation function. $\Theta(n,\omega)$ is assumed to smoothly vary with frequency, so it could take the form of a polynomial like a quadratic whose coefficients $k_2$, $k_1$ and $k_0$ are to be solved such that $\Theta(n,\omega) < \pi$. If a mixture of source elements were to be deployed with different output levels and/or were to be operated over different frequency bands that were a subset of Fmin to Fmax band, that information may be included in the amplitude level term B(0)).

The overall performance index $Q_k$ for the $k^{th}$ source geometry candidate may take the following form:

$$Q_k = \sum_{m=1}^{N_f} |\hat{A}(\varphi, \omega_m)|^2 / [1 + \lambda P(\varphi, \omega_m)] \quad (7)$$

where $|\hat{A}(\varphi, \omega_m)|$ is the mean magnitude of the far-field output in the $\varphi$ direction averaged over the azimuth angle range $\alpha_1 < \theta < \alpha_2$ using the beam form filters G that maximize the average output over the azimuth angle range in the $\varphi$ direction at discrete frequency $\varphi_m$, and $P(\varphi, \omega_m)$ is a penalty function that is discussed next. Note that the performance index $Q_k$ is summed over a given number of frequencies $N_f$. This number may vary from survey to survey, depending on the survey's needs. Note that the performance index may be defined to take another form.

In one application, the penalty function $P(\varphi, \omega_m)$ may be used, with $0 < P(\varphi, \omega_m)$, to introduce other problem constraints. For example, the penalty function can be used to ensure there are no spectral notches in the output at particular frequencies, and/or that the source elements are not over- or under-driven, and/or the array length is not too large, and/or the array depth is not too deep. Parameter $\lambda$ is a weighting parameter having a value equal to or larger than zero. Thus, when the value is zero, the penalty function has no effect. As parameter $\lambda$ is increased, the penalty function has a greater impact on the final outcome of the candidate source elements distribution.

Then, in step 408 a decision is made whether the phases and/or amplitudes considered for each source element are appropriate. If the answer is yes, the values of the performance index, the phases and/or amplitudes and the beam form filters are stored in step 410 in a memory device. Optionally, the process may return to step 402 for finding better phases and/or amplitudes. If the answer is no, the process automatically returns to step 402 for finding another combination of phases and/or amplitudes for the source elements.

To facilitate the acquisition process, if the source array's geometry is known beforehand, tables of beam form filters for various beam shapes could be computed prior to the seismic survey and their values stored and catalogued in a filter library on the vessel structure's controller. The filters could be catalogued/indexed by the preferred vertical and azimuth angles or other descriptor that informs the user as to the shape and/or direction of the radiated energy. While conducting a seismic survey, seismic data may be collected utilizing multiple sets of beam form factors. In one application, the source elements of the source array may be divided into two or more groups, and beam form factors may be calculated for each group so that a first group illuminates an area of interest with a first directivity angle and a second group illuminates the same area of interest with a second directivity angle. In another application, the beam direction and its range of azimuths are calculated for each group independent from other groups. In other words, the methods discussed herein can be applied to the entire source array or to groups making up the source array. These groups may be driven independent of each other (i.e., with different directivities and azimuth ranges) for the same local area of interest. It can be appreciated that in an equivalent implementation, the beam form factors could be implemented in the time domain as IIR or FIR digital filters rather than represented in the frequency domain as phase and amplitude coefficients.

Figure 6:
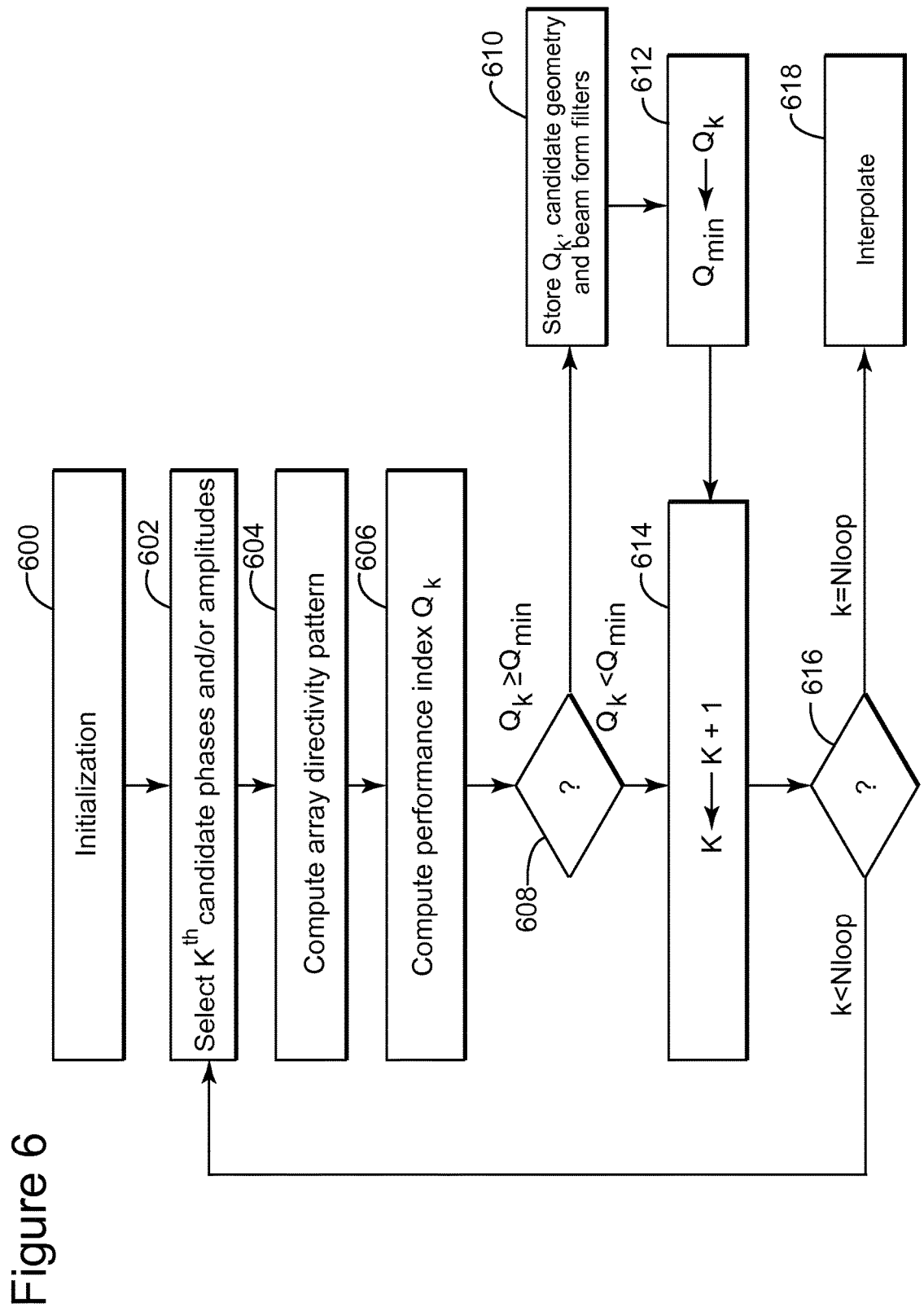
FIG. 6 is a flowchart of a method for calculating phases and/or amplitudes for desired beam directions.

The above-discussed method may be implemented in a controller, as discussed next, located on the vessel, for forming a beam that achieves a desired target illumination. With regard to FIG. 6, the implementation includes a step 600 in which the controller is initialized. This step may include, for example, setting a number of loops to run for the best source array directivity, setting an index k, initializing a minimum acceptable performance index Qmin, etc. Then, in step 602, a combination of phases and/or amplitudes and/or geometries for the source elements is selected and the resulting beam form factors are used to compute the array directivity pattern in step 604, for example, based on equations (5) and (6). In step 606, the performance index $Q_k$ is calculated, for example, based on equation (7). The result of this step is compared in step 608 with a given value $Q_{min}$. If the computed value $Q_k$ is greater than $Q_{min}$, then $Q_k$, the considered phases and/or amplitudes and/or geometry of the source elements and the calculated beam form filters G and form factors, is stored in a memory in step 610. The process may then be repeated for a combination of phases and/or amplitudes and/or geometries after $Q_{min}$ is updated in step 612 and index k is increased in step 614. In step 616, it is verified that the loop number is still smaller than a given loop number Nloop. If the result is yes, the process returns to step 602 to select another candidate and repeat the above-noted steps. If the result is no, the process is terminated, but not before calculating in step 618 the value of $Q_k$ for other frequencies than those noted in equation (7). This step may include an interpolation procedure for calculating the performance index for a frequency $f_a$, which lies between frequencies $f_i$ and $f_{i+1}$ used in equation (7). These results are also stored in the memory. Such a method may calculated only the beam form filters (i.e., for a given geometry of the source array), or only the beam form factors (i.e., for a changing geometry of the source array) or both.

Note that this is an iterative process that "tries" many combinations of phases and/or amplitudes and/or geometries for determining a beam having a desired directive and shape. Those skilled in the art would appreciate that these methods may be modified to use a model that predicts the beam characteristics based on the phases and/or amplitudes and/or geometry, i.e., a deterministic process instead of the iterative process discussed with regard to FIG. 6.

Having determined the source elements' phases and/or amplitudes that best achieve the desired output, the controller may automatically (e.g., without human intervention) and dynamically (e.g., based on a position of the source array in the area of interest) download different beam form filters and/or beam form factors from the computer memory storage device and convolve them with the pilot signal to form updated drive signals V1 to V8. The updated source drive signals V1 to V8 can be downloaded into the source controllers in a timely fashion and then utilized in subsequent shots. For improved results, the controller needs to have access to: survey parameters, navigation information, a priori geophysical information about the target objective, and/or the library of beam form filters and/or factors.

Figure 7:
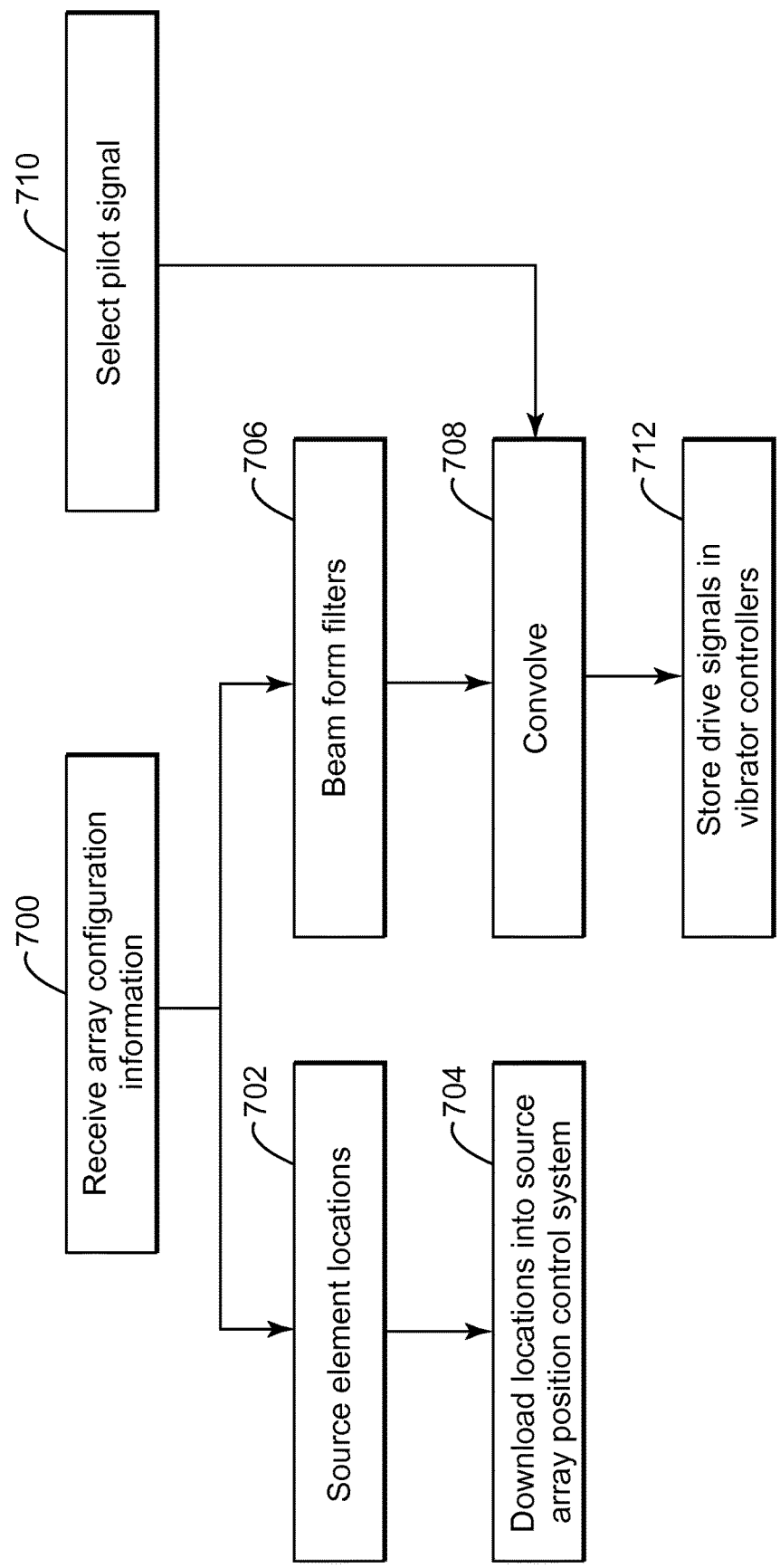
FIG. 7 is a flowchart of a method for calculating driving signals for a source array having a desired directivity.

The above process is now discussed with regard to FIG. 7. In step 700, controller 322 or another controller receives the source array configuration information, i.e., the source elements distribution. This may include the X, Y and Z position for each source element of the source array as noted in step 702. This information is sent in step 704 to a source array position control system, which may be controller 322 or any other controller. Then, the controller implements these positions by adjusting each source element, if this feature is available. This step is skipped if the source array's geometry is fixed.

The controller may also receive in step 700 the beam form filters and/or factors 706 (calculated as illustrated in FIGS. 4 and/or 6), which are convolved in step 708 with a pilot signal 710 to form in step 712 the drive signals, which are stored in the vibrator controllers. Then, when the newly calculated drive signals of the source elements are ready, controller 322 instructs the local controllers to drive the source elements to obtain the desired beam shape.

The beam steering process may be performed, for example, in discrete steps, i.e., the controller switches the beam from a first angle to a second angle, or this transition could be performed smoothly. For a smooth transition or to scan continuously over a range of directivity angles, beam form filters G1 . . . G8 would be time variant filters rather than time-invariant.

Discrete steps are used to change the beam's directivity for the case of swept sine wave pilots. Because pseudorandom signals can also be used for pilot signals, they may be better suited for smooth transitioning, continuous or semi-continuous scanning through a range of directivity angles. Pseudorandom signals emit many frequencies at the same time, while swept sine waves generate only a narrow band or effectively a single frequency at any point in time.

The previous embodiments have been discussed, for simplicity, for source elements emitting the same frequencies, i.e., having the same size. However, it is possible to apply the methods discussed above to source elements not emitting the same frequencies at the same time. This case may be treated as having two independent arrays. Thus, mutual impedance loading effects and array interaction are not of serious concern, since frequencies from one source array should be orthogonal with frequencies from the other source array at the same point in time, although some nonlinear effects may be present. For example, the small source elements, while trying to generate frequency F1, might see the pressure field created by the large source elements operating at frequency F2. Thus, if small and large source elements are too close to one another, there might be some intermodulation distortion produced in the smaller vibrators, i.e., some F2-F1 and some F2+F1 energy.

It is believed that this effect will be mitigated if the small source elements are at much shallower depth than the large source elements, because the large source surface ghost tends to cancel the contribution of the large source element as seen by the shallow small source element. This is so because the large source element ghost and the large source element will be nearly the same distance from the small source element, but opposite in polarity. Thus, if there are large and small source elements in the same source array, it is possible to optimize these separately.

It is also possible to design high-frequency source arrays that are frequency-scaled versions of low-frequency source arrays and vice versa. In other words, a high-frequency array having the same shape (curvature) as a low-frequency array but dimensionally scaled inversely by the ratio of their operating frequencies, can be used to produce acoustic output whose directivity pattern matches that of the low-frequency array provided that it is operated at a depth that has also been dimensionally scaled by the same factor. Furthermore, the beam filter and/or factor bank coefficients that have been calculated for use with the low-frequency array can be applied at the appropriate scaled frequency to the high-frequency source elements. Thus, for the case where two arrays operate over different frequency bands and are dimensionally scaled versions of one another, it is possible to frequency translate beam filters and/or factors used for a first array and then apply them to a second array so that acoustic energy radiated over different frequency bands is directed in the same way.

For one embodiment, the source elements in the first source array can be identical in make/model and be operated using the same drive signal. The source elements comprising the second source array can be identical in make/model and be operated using the same drive signal. However, the source elements from the first source array may be different from the source elements in the second source array.

In still another embodiment, the source array dimension could be selected and drive signals designed so that the beam shape can be made variable to correspond to the frequencies expected to be received from different target depths. Low frequencies, for example, may be more important for imaging subsalt, while higher frequencies are useful for pre-salt subterranean features. Thus, energy returning from subsalt images can have ray paths that deviate from vertical, more so than arrivals from shallow pre-salt events. For example, for the low frequencies, the beam shape could be adjusted to provide wide beam illumination, and then for high frequencies, the beam shape can be focused to better image shallow reflections. If desired, and the low-frequency array is large enough in dimension, the opposite could also be possible so the low-frequency energy is concentrated in a preferred direction while the high-frequency emissions might have a wider beam illumination.

Figure 9:
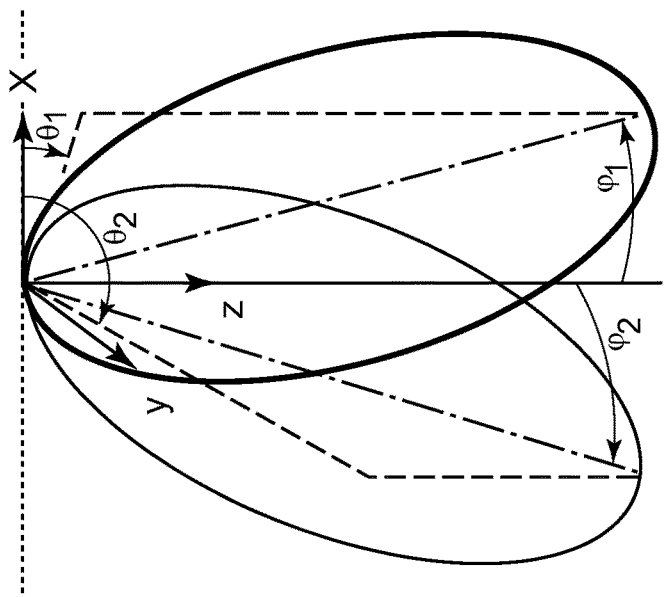
FIG. 9 is a schematic diagram of a source array's beam having two different directions.
Figure 8:
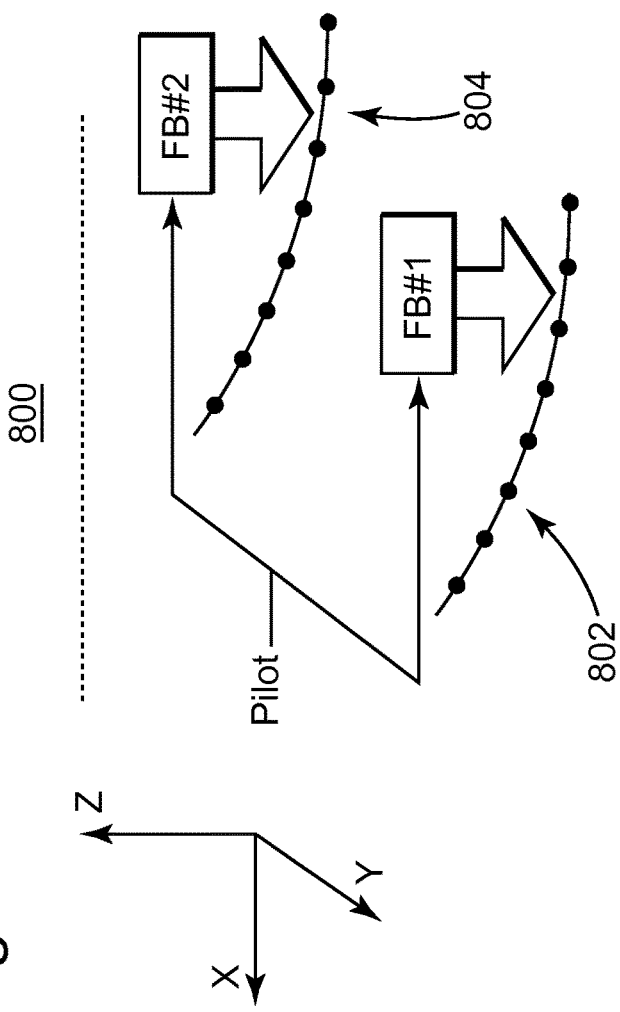
FIG. 8 is a schematic diagram of a source array having a bank of beam form factors.

Next, various considerations related to implementing the above methods for a seismic survey that includes at least two sub-arrays are discussed with regard to FIGS. 8 and 9. According to an embodiment illustrated in FIG. 8, a seismic acquisition system 800 includes a first sub-array 802 and a second sub-array 804. In one application, each sub-array may be a source array that includes corresponding sub-arrays. The two sub-arrays may be towed along an inline direction −X by the same vessel (not shown) or by different vessels. In one embodiment, one or both sub-arrays may be attached to a permanent structure, e.g., oil rig, or to a movable platform, e.g., submarine, autonomous underwater vehicle, etc. To direct the energy in a preferred cross-line direction Y, substantially perpendicular to inline direction X, the two sub-arrays are separated along the cross-line direction Y. Some spatial separation in the Y-direction allows control of directivity and azimuth. Another option would be to use sub-arrays that have their curvatures in the X-Y plane. Note that sub-arrays 802 and 804 have a curvature in the X-Z plane, where Z points in the same direction as the gravity vector—that is toward the center of the earth. Each sub-array has its own bank of beam form filters and/or factors FB#i, where "i" is one or two for this case, and the source elements of each sub-array are coplanar in the X-Z plane.

The beam filter banks in FIG. 8 can be initially selected to steer the radiated energy in direction $\varphi_1, \theta_1$ as illustrated in FIG. 9. Then, as the vessel moves along a survey line, the filter and/or factor banks can be changed either in a stepwise fashion or in a semi-continuous fashion to steer the radiated acoustic energy in direction $\varphi_2, \theta_2$. The change in directivity is expected to happen when the vessel enters or exits one of the areas 210, 220 or 230 identified during the test survey as being different. The controller needs access to the vessel's navigation system to determine when the vessel enters or exits one of these areas.

While it was assumed that the controller can automatically and dynamically determine which beam form filters and/or factors to select, note that the operator of the marine survey may override the controller and make a manual change regarding which directivity to implement for the source array's beam.

Figure 10:
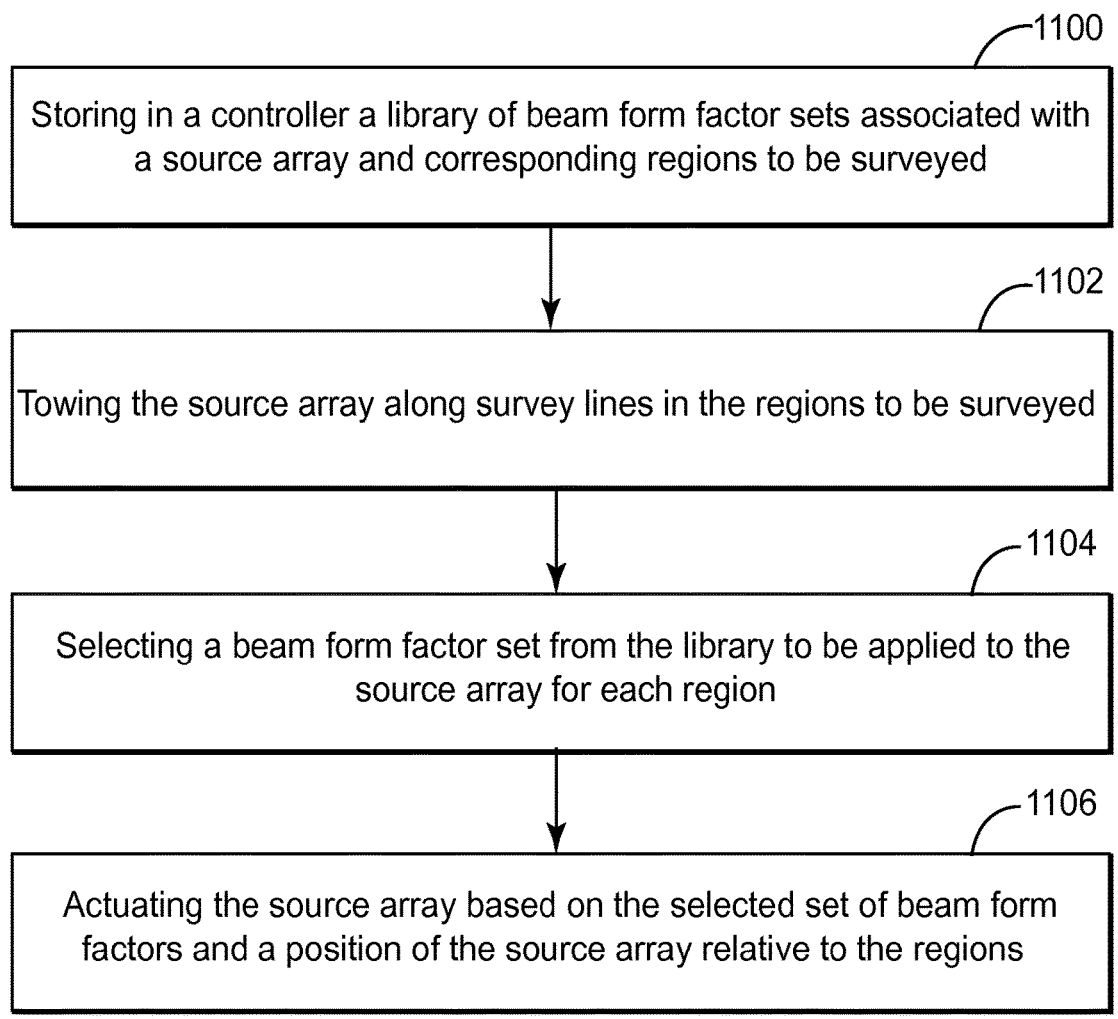
FIG. 10 is a flowchart of a method for acquiring seismic data with an adjustable source array.

According to an embodiment illustrated in FIG. 10, there is a method for seismic data acquisition that includes a step 1000 of storing in a controller a library of beam form factor sets associated with a source array and corresponding regions to be surveyed, a step 1002 of towing the source array along survey lines in the regions to be surveyed, a step 1004 of selecting a beam form factor set from the library to be applied to the source array for each region, and a step 1006 of actuating the source array based on the selected set of beam form factors and a position of the source array relative to the regions. Each set of beam form factors maps to a corresponding region of an area to be surveyed.

Figure 11:
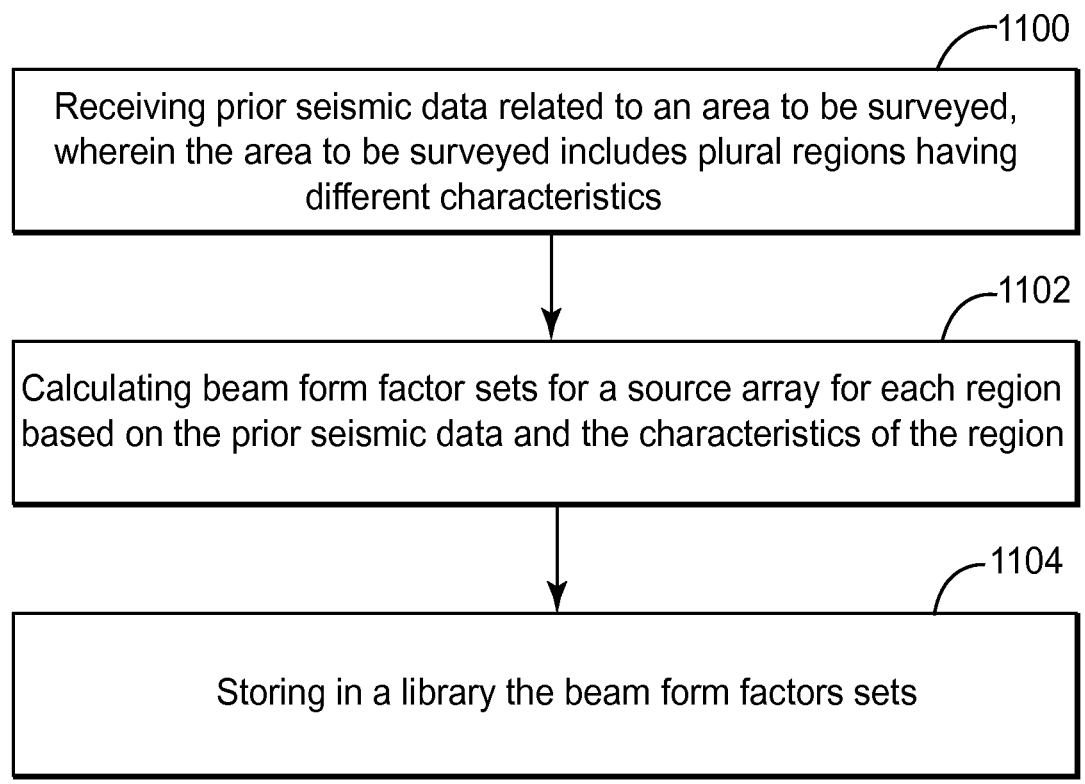
FIG. 11 is a flowchart of a method for determining form factors for various beam orientations.

According to another embodiment illustrated in FIG. 11, there is a method for generating sets of beam form factors associated with a source array. The method includes a step 1100 of receiving prior seismic data related to an area to be surveyed, wherein the area to be surveyed includes plural regions having different characteristics, a step 1102 of calculating beam form factor sets for a source array for each region based on the prior seismic data and the characteristics of the region, and a step 1004 of storing in a library the beam form factors sets.

The above-discussed methods may be improved as now discussed. Because source elements are towed below the water surface, notches in their output spectrum are produced. The notch is the result of the air/water interface reflection coefficient that is typically −1. The reflection coefficient of −1 is due to the difference in the acoustic impedance of the water and the air, i.e., due to the propagation of the wave from a medium with a high acoustic impedance into one with a low acoustic impedance. A down-going wave generated by the source combined with an up-going wave reflected at the air/water interface create destructive interference at some frequencies and peaks at others.

Figure 12:
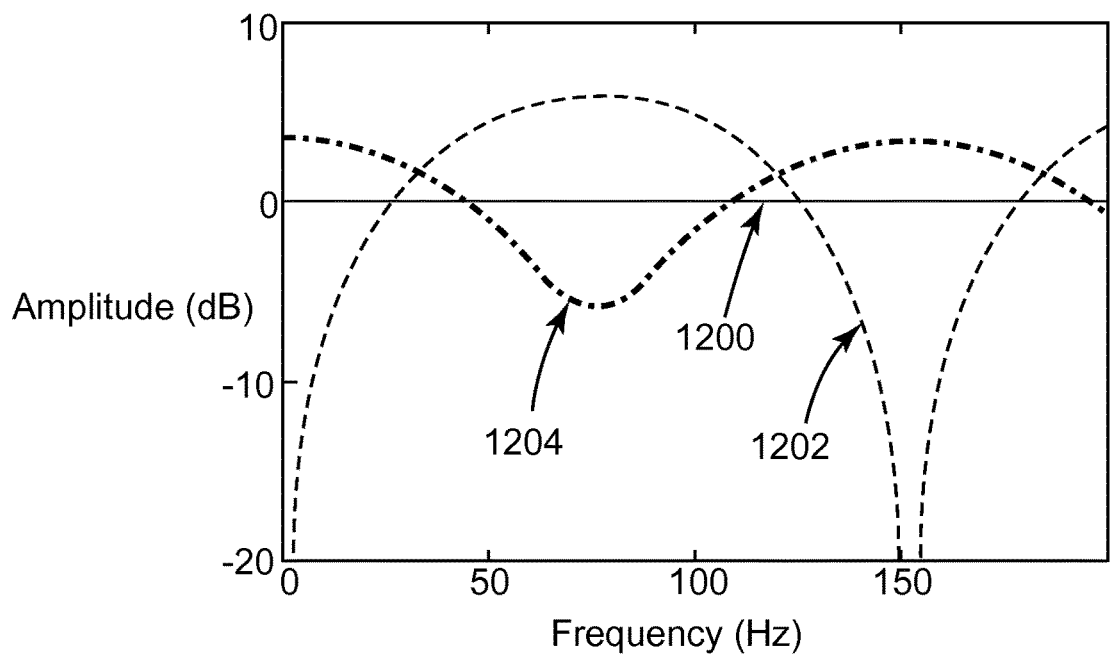
FIG. 12 illustrates an amplitude spectrum for a source operating at a 5 m depth for different surface reflection coefficients.
Figure 13:
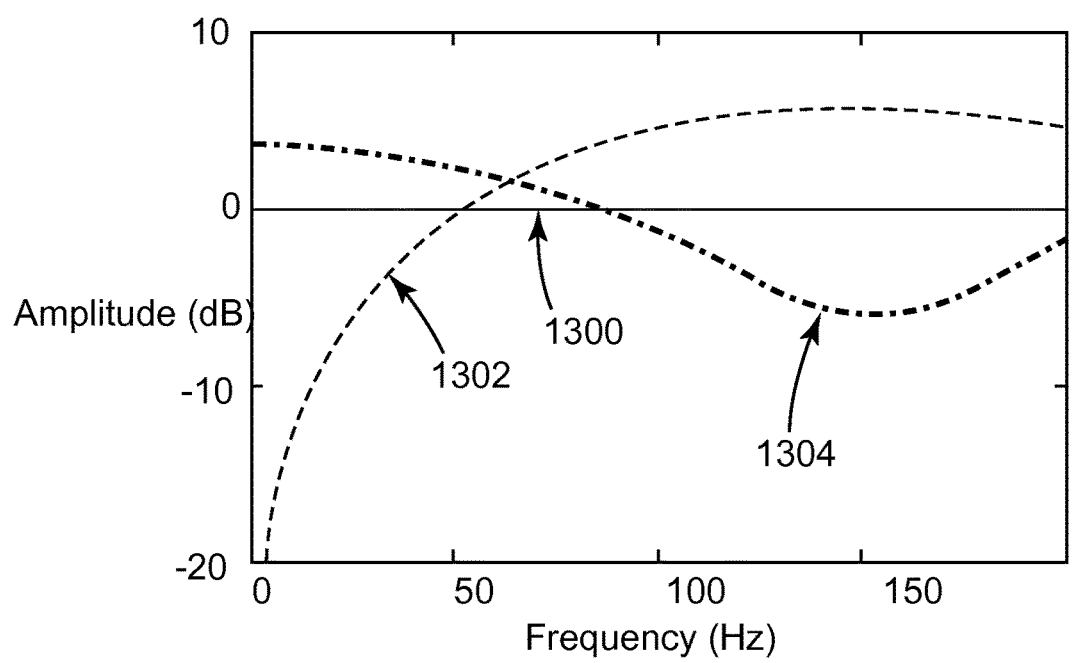
FIG. 13 illustrates an amplitude spectrum for a source operating at a 2.5 m depth for different surface reflection coefficients.

The destructive interference creates notches in the spectrum, which pose serious problems during the processing phase. Various notches are illustrated in FIG. 12, which illustrates the far-field amplitude for a vertically propagating wavefront for a source element operating at a depth of about 5 m for different surface reflection coefficients "r". Curve 1200 corresponds to r=0, curve 1202 corresponds to r=−1 and curve 1204 corresponds to r=+0.5. Under normal operating conditions, i.e., r=−1, one notch is seen at frequency zero and another one at frequency 152 Hz. Constructive interference is seen having a 6 dB peak at 76 Hz. If the reflection r is zero or positive, the notch at 0 Hz is eliminated. FIG. 13 illustrates a source element's amplitude for a depth of 2.5 m and different reflection coefficients, where curve 1300 corresponds to r=0, curve 1302 corresponds to r=−1, and curve 1304 corresponds to r=+0.5.

Figure 14:
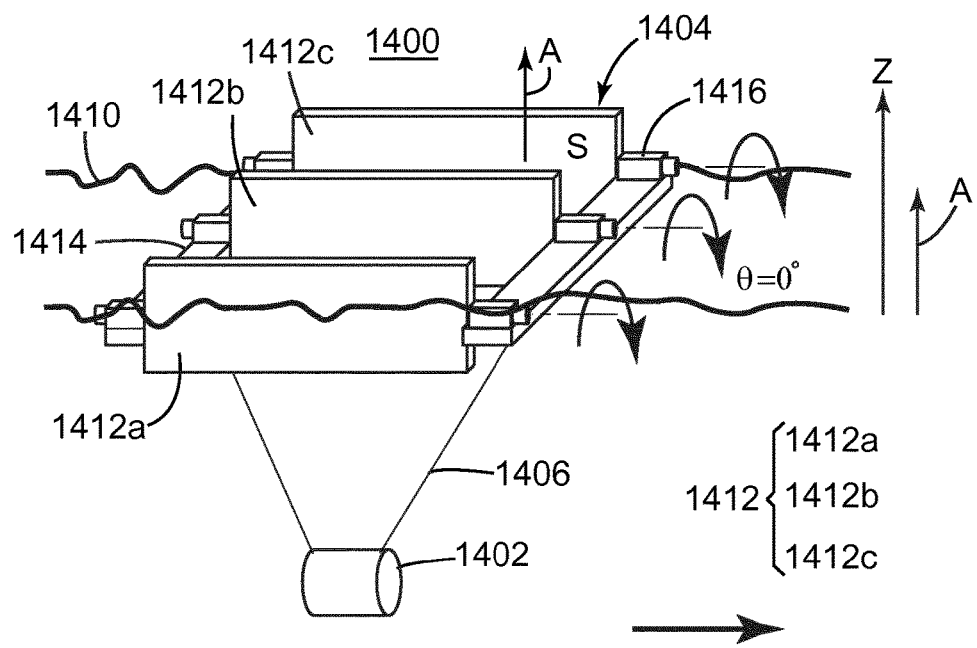
FIG. 14 is a schematic diagram of a source element having a flotation device with reflector panels.

Thus, it would be advantageous if there is a mechanism that alters the reflection coefficient, at least in an area just above the source array. According to an embodiment, source arrays towed at shallow depth may use a flotation device, e.g., a float to help the source array maintain its depth from the surface. FIG. 14 illustrates a single source element 1402 suspended from a flotation device 1404 through one or more links 1406. Flotation device 1404 may be configured to float at or below the water surface 1410. Source element 1402 may be any known source element, e.g., a vibratory source element. In one application, the entire source array may be linked to an appropriate flotation device similar to the one now discussed. In still another application, each source element of a source array may have its own flotation device similar to the one now discussed.

The flotation device 1404 may be constructed of one or more reflector panels 1412a-c rotatably attached to a frame 1414. If more than a reflector panel is used, they form a reflector panel array 1412. In one application, the reflector panel may be made of a rigid, lightweight material. An actuation mechanism 1416 may be attached to each reflector panel 1412a-c for controlling their rotations. In one application, each reflector panel has its own actuation mechanism. The actuation mechanisms may be independently controlled by a controller, e.g., controller 322 illustrated in FIG. 3. The reflector panels' 1412a-c size may be determined based on the depth and frequency emitted by each source element. The reflector panels are shown in FIG. 14 making an angle θ with respect to axis Z, which points vertically downward toward the earth's center. Angle θ is defined by line A that extends within a face S of the reflector panel and vertical axis Z and is substantially zero for this case, i.e., the reflector panels are substantially perpendicular to the water surface. Because the reflector panels are vertical, pressure waves radiated by source element 1402 toward sea surface 1410 will "see" an effective overall reflection coefficient that is shifted only slightly from −1 toward zero. For this case, the "free-surface" looks like a combination of (i) hard reflectors having a small effective area that present a positive reflection coefficient to the impinging wave front and (ii) regions of water/air interface that have a −1 reflectivity at least for ray paths that are close to vertical. Thus, depending upon the properties of the reflector panels and the ratio between the water surface area and the area of the panels facing the source element, the shift of the reflection coefficient from −1 toward zero or even to a positive value is observable.

Figure 15:
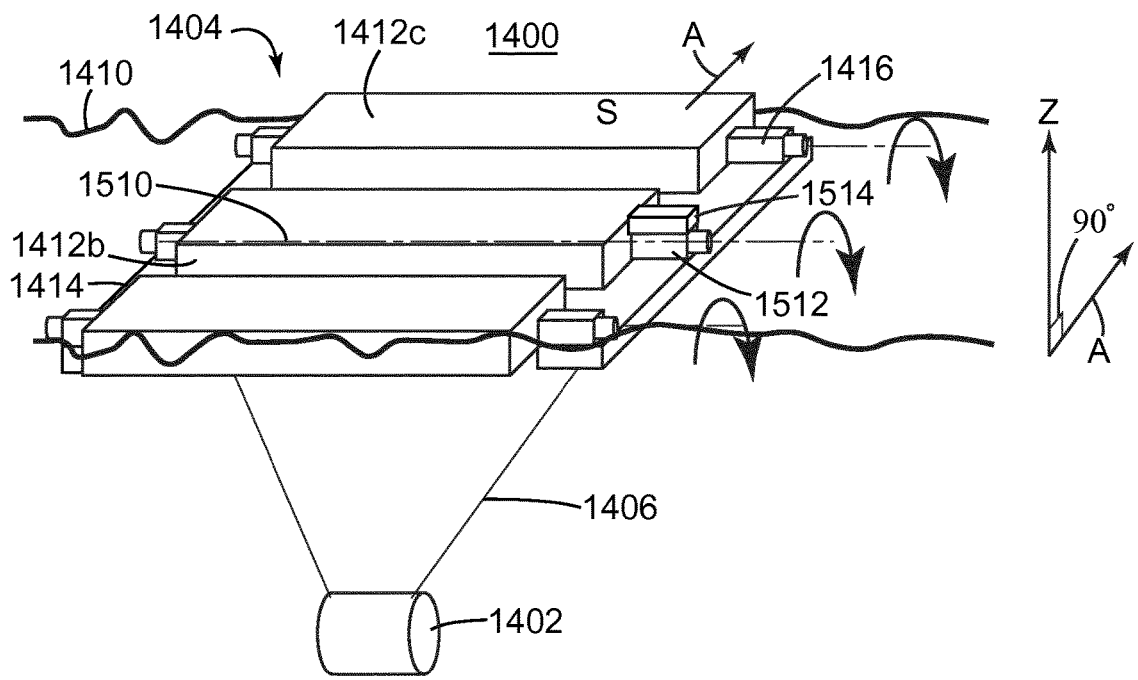
FIG. 15 is a schematic diagram of a source element having a flotation device with rotated reflector panels.

In FIG. 15, the reflector panels are rotated so that angle θ is about 90°, i.e., the reflector panels are horizontally oriented. For this case, the relative area of the water to the effective panel area has been greatly increased and, thus, the overall surface reflection coefficient r is shifted more toward +1, at least for ray paths that are close to vertical if the reflector panels are constructed to have high acoustic impedance or tend to act like a rigid barrier.

Figure 16:
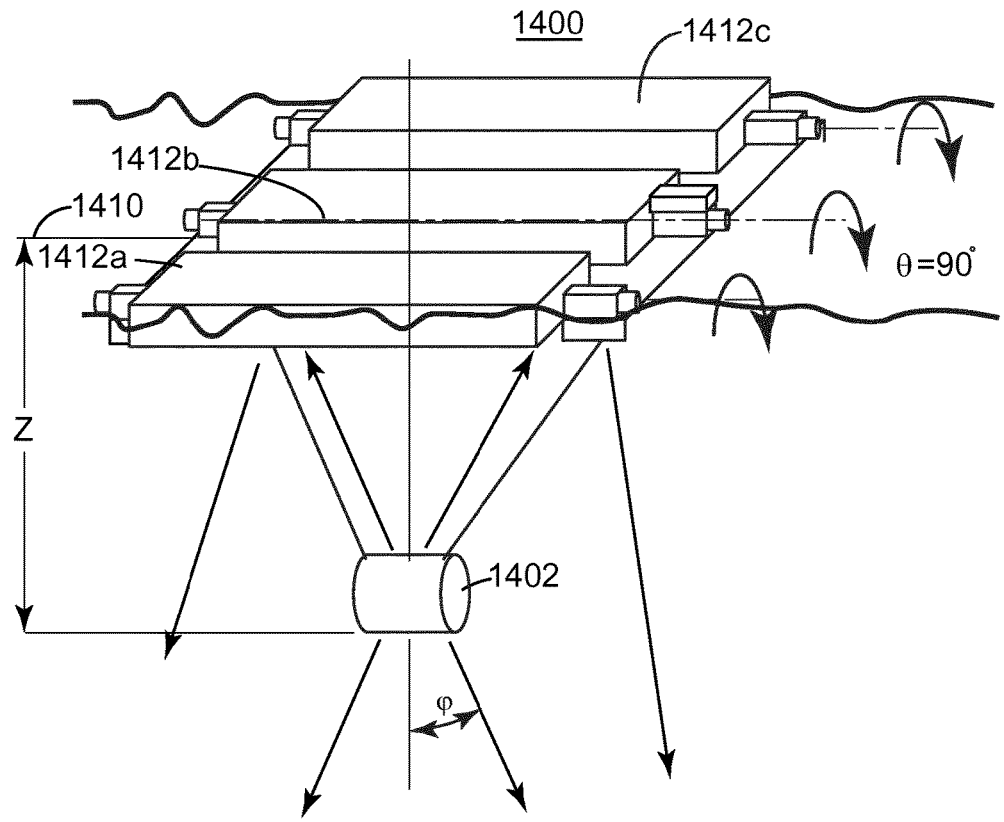
FIG. 16 is a schematic diagram illustrating a range of acoustic waves that experience a modified reflectivity coefficient due to the reflector panels.

Because the reflector panel is of finite dimension, the range of angles over which the surface reflection coefficient can be changed is limited. FIG. 16 illustrates the range of angles, with φ being the maximum effective angle for which the reflection coefficient can be altered. Assuming that the reflector panels are located directly over source element 1402, then φ is a function of the depth "z" of the source element relative to water surface 1410 and the overall dimension of the reflector panel array 1412. The effective reflection coefficient will also be a function of frequency, because the size of the reflector panels relative to the wavelength of the acoustic energy matters. In one embodiment, the reflector panel or reflector panel array dimension will need to be larger than about ½ the wavelength emitted by the source for achieving significant effects. In one application, the reflector panel properties are measured to calibrate the entire acquisition system before being deployed for a seismic survey. The reflector panel may be best suited for use with source elements that operate at moderate to high seismic frequencies and are towed at a modest depth.

The reflector panels may be fabricated as a sandwich of metal plates with a rigid foam material in between. The exterior of the panel may be coated with urethane or other similar material to resist seawater exposure. In one application, as illustrated in FIG. 15, a panel 1412b may have a center shaft 1510 retained with corresponding bearings 1512, and the center shaft may be angularly positioned with a motor 1514. Each reflector panel may have its own motor for being independently adjusted while in water. In one application, a single motor simultaneously adjusts all the reflector panels. The one or more motors may be controlled by controller 322 located on the towing vessel as illustrated in FIG. 3. Thus, in one application, the reflector panel array may be operated with some reflector panels vertically oriented and others horizontally oriented to control the reflection coefficient.

Figure 17:
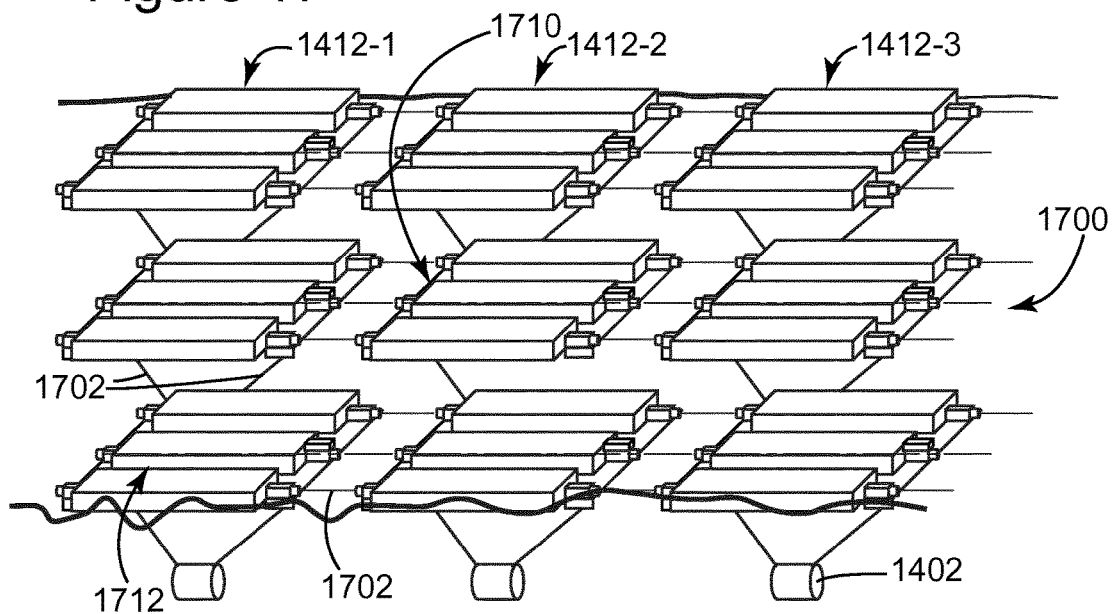
FIG. 17 is a schematic diagram of a source array comprised of linked adjustable floating reflectors.

Reflector panels may be used in a source array, in which many source elements are suspended from them. The reflector panel arrays of the source elements may be connected together with links 1702 (e.g., with chains, ropes, etc.) to form a large reflection surface (extended array 1700) that is directly above the entire source array, as shown in FIG. 17. This arrangement tends to be more effective over a wider range of ray paths than using a single reflector panel array per source element because the overall dimension of the reflective surface is much greater. As previously discussed, not all the reflector panels would be positioned in the same way. For example, it is possible to position the reflector panels near the center 1710 of the extended array 1700 to be horizontal, while panels near the perimeter 1712 of the extended array 1700 may be tilted at, for example, a predetermined angle, e.g., 45°. Other reflector panel tilt arrangements may be used depending on the nature of the survey, the structure of the subsurface, etc.

In another embodiment, if the source array is vibratory and executes a chirp, for example, going from 25 Hz to 150 Hz, and the reflector panels can be quickly rotated, it is possible for the controller 322 to synchronize the panel orientation with the instantaneous source emission frequency so as to continuously tune the reflection coefficient to maximize the far-field output.

Thus, the methods discussed with regard to FIGS. 10 and 11 may be extended or modified to calculate reflector panels' orientation relative to the water surface for controlling a reflection coefficient associated with waves generated by the source array and propagating toward the air-water interface, and/or coordinating adjustments of the reflector panels' orientations with the instantaneous source array emission frequency to continuously tune the reflection coefficient to maximize a far-field output of the source array.

The methods discussed earlier for calculating one or more sets of beam form factors and/or filters may be extended to also take into account the water surface's reflection coefficient. For example, the beam form factor set may take into account not only the phase and/or amplitude of the drive signals applied to each source array element, but also the geometry of the source array and the water's reflectivity above the source array. Thus, for this example, the controller or operator of the seismic survey may select a beam form factor set based on the current geometry of the source array, the current water's reflectivity, and the characteristics of the subsurface (e.g., the beam form filter set). If the geometry of the source array is fixed and the water's reflectivity is also fixed, then the choice is limited to only the beam form filter set from a library of beam form filter sets.

Figure 18:
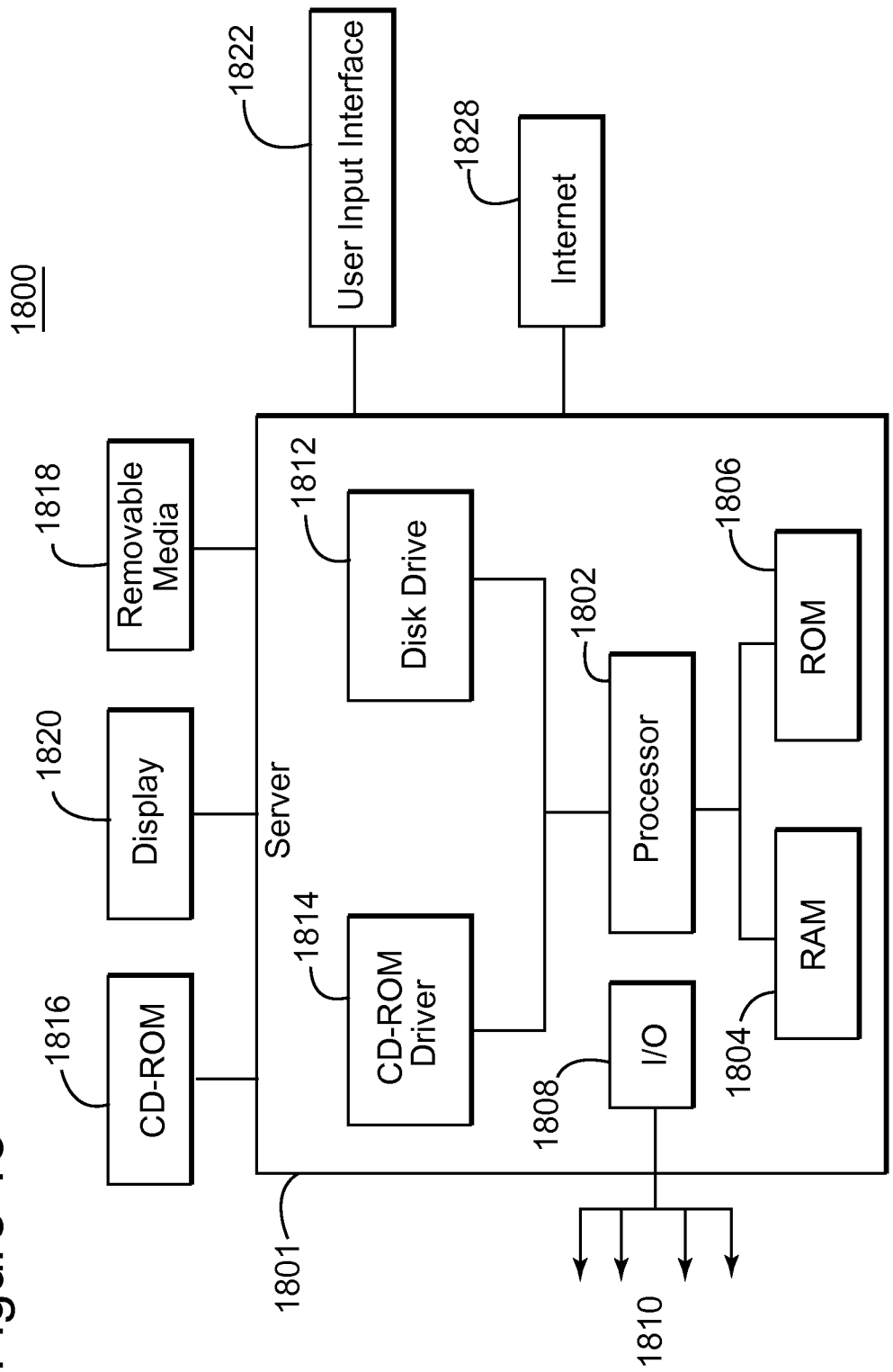
FIG. 18 is a schematic diagram of a control system.

An example of a representative control system capable of carrying out operations in accordance with the exemplary embodiments discussed above is illustrated in FIG. 18. Hardware, firmware, software or a combination thereof may be used to perform the various steps and operations described herein.

The exemplary control system 1800 suitable for performing the activities described in the above-noted embodiments may include server 1801. Such a server 1801 may include a central processor unit (CPU) 1802 coupled to a random access memory (RAM) 1804 and to a read-only memory (ROM) 1806. ROM 1806 may also be other types of storage media to store programs, such as programmable ROM (PROM), erasable PROM (EPROM), etc. Processor 1802 may communicate with other internal and external components through input/output (I/O) circuitry 1808 and bussing 1810, to provide control signals and the like. For example, processor 1802 may communicate with the sensors, electromagnetic actuator system and/or the pressure mechanism of the source element. Processor 1802 carries out a variety of functions as are known in the art, as dictated by software and/or firmware instructions.

Server 1801 may also include one or more data storage devices, including hard and disk drives 1812, CD-ROM drives 1814, and other hardware capable of reading and/or storing information, such as a DVD, etc. In one embodiment, software for carrying out the above-discussed steps may be stored and distributed on a CD-ROM 1816, removable media 1818 or other form of media capable of portably storing information. These storage media may be inserted into, and read by, devices such as the CD-ROM drive 1814, the disk drive 1812, etc. Server 1801 may be coupled to a display 1820, which may be any type of known display or presentation screen, such as LCD, plasma displays, cathode ray tubes (CRT), etc. A user input interface 1822 is provided, including one or more user interface mechanisms such as a mouse, keyboard, microphone, touch pad, touch screen, voice-recognition system, etc.

Server 1801 may be coupled to other computing devices, such as the equipment of a vessel, via a network. The server may be part of a larger network configuration as in a global area network (GAN) such as the Internet 1828, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

Some of the disclosed embodiments provide a source array, source element and a method for using, in a marine environment, substantially permanent source arrays capable of steering their beams during a seismic survey. Other disclosed embodiments provide a substantially permanent source array for hire. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic data acquisition, the method comprising:
   computing beam form factor sets for a source array that includes vibratory elements, the beam form factor sets being computed based on (1) a geometry of the source array, which includes a depth and a length of the source array, (2) a size of the source array, which includes a number of the vibratory elements, and (3) a frequency range of interest to be emitted by the source array;
   storing in a controller a library of the beam form factor sets, wherein the library is associated with the source array and corresponding regions to be surveyed;
   towing the source array along survey lines over the regions to be surveyed;
   selecting a beam form factor set from the library to be applied to the source array for each region, based on a current geometry of the source array, a current water's reflectivity, and characteristics of the region; and
   actuating the source array based on the selected set of beam form factors and a position of the source array relative to the regions,
   wherein each set of beam form factors maps to a corresponding region of an area to be surveyed.

2. The method of claim 1, further comprising:
   automatically and dynamically selecting a single set from the beam form factor sets for a region being traversed by the source array.

3. The method of claim 1, further comprising:
   automatically and dynamically selecting plural sets from the beam form factor sets for a region being traversed by the source array.

4. The method of claim 1, wherein when one of the beam form factor sets is applied to the source array, a beam having a given directivity is generated.

5. The method of claim 4, wherein the directivity is described by a vertical angle between the beam and gravity.

6. The method of claim 5, wherein the directivity is also described by an azimuth angle of the beam.

7. The method of claim 1, further comprising:
   adjusting an illumination of a feature being surveyed as the source array advances along a survey line.

8. The method of claim 1, wherein each vibratory element is activated by a corresponding beam form factor.

9. The method of claim 1, wherein prior seismic data is acquired during a test survey of the area to be surveyed or retrieved from a prior seismic survey is used for the computing of the beam form factor sets.

10. The method of claim 1, further comprising:
    adjusting orientations of reflector panels associated with the source array, relative to water surface, for controlling a reflection coefficient of waves generated by the source array and propagating toward the air-water interface.

11. The method of claim 10, further comprising:
    coordinating the adjusting of the orientations of the reflector panels with the instantaneous source array emission frequency so as to continuously tune the reflection coefficient to maximize a far-field output of the source array.

12. The method of claim 1, wherein a beam form factor set becomes a beam form filter set if the geometry of the source array and the water's reflectivity above the source array are fixed.

13. A method for generating sets of beam form factors associated with a source array, the method comprising:
    receiving prior seismic data related to an area to be surveyed, wherein the area to be surveyed includes plural regions having different geological characteristics;
    calculating beam form factor sets for the source array for each region based on the prior seismic data and the geological characteristics of the region; and
    storing in a library the beam form factors sets,
    wherein the source array includes vibratory elements, and
    wherein the beam form factor sets are calculated based on (1) a geometry of the source array, which includes a depth and a length of the source array, (2) a size of the source array, which includes a number of the vibratory elements, and (3) a frequency range of interest to be emitted by the source array.

14. The method of claim 13, wherein the geological characteristics include chalk, salt and dipping features.

15. The method of claim 13, wherein a set of beam form factors, when applied to the source array, generate a beam having a given directivity.

16. The method of claim 15, wherein the directivity is described by a vertical angle between the beam and gravity.

17. The method of claim 16, wherein the directivity is also described by an azimuth angle of the beam.

18. The method of claim 13, wherein the prior seismic data is acquired during a test survey of the area to be surveyed or from a prior seismic survey.

19. The method of claim 13, further comprising:
    calculating orientations of reflector panels associated with the source array, relative to water surface, for controlling a reflection coefficient of waves generated by the source array and propagating toward the air-water interface; and
    coordinating the adjusting of the orientations of the reflector panels with the instantaneous source array emission frequency so as to continuously tune the reflection coefficient to maximize a far-field output of the source array.

* * * * *